United States Patent
Zhu et al.

(10) Patent No.: US 9,537,615 B2
(45) Date of Patent: Jan. 3, 2017

(54) FLEXIBLE HARQ ACK/NACK TRANSMISSION

(75) Inventors: Jianchi Zhu, Beijing (CN); Zhi Zhang, Beijing (CN); Haipeng Lei, Beijing (CN); Kodo Shu, Shanghai (CN)

(73) Assignee: NOKIA CORPORATION, Espoo (FI)

( * ) Notice: Subject to any disclaimer, the term of this patent is extended or adjusted under 35 U.S.C. 154(b) by 50 days.

(21) Appl. No.: 14/405,454

(22) PCT Filed: Jun. 28, 2012

(86) PCT No.: PCT/CN2012/077739
§ 371 (c)(1),
(2), (4) Date: Dec. 4, 2014

(87) PCT Pub. No.: WO2014/000221
PCT Pub. Date: Jan. 3, 2014

(65) Prior Publication Data
US 2015/0103775 A1    Apr. 16, 2015

(51) Int. Cl.
| | | |
|---|---|---|
| *G01R 31/08* | (2006.01) | |
| *H04L 5/14* | (2006.01) | |
| *H04J 3/00* | (2006.01) | |
| *H04L 1/18* | (2006.01) | |

(52) U.S. Cl.
CPC .......... *H04L 1/1893* (2013.01); *H04L 1/1812* (2013.01); *H04L 1/1822* (2013.01); *H04L 1/1864* (2013.01)

(58) Field of Classification Search
CPC .... H04L 1/1893; H04L 1/1812; H04L 1/1864; H04L 1/1822
See application file for complete search history.

(56) References Cited

U.S. PATENT DOCUMENTS

| | | | |
|---|---|---|---|
| 2010/0254327 A1 | 10/2010 | McBeath et al. | |
| 2011/0317670 A1* | 12/2011 | Zhang .................. | H04L 1/1822 370/336 |
| 2011/0317778 A1* | 12/2011 | Hooli ....................... | H04L 1/06 375/260 |
| 2012/0034927 A1* | 2/2012 | Papasakellariou .... | H04L 1/1861 455/450 |
| 2012/0166671 A1* | 6/2012 | Qi .......................... | H04L 45/64 709/236 |
| 2013/0176950 A1* | 7/2013 | Hakola ............... | H04W 72/042 370/329 |
| 2014/0355493 A1* | 12/2014 | Niu ...................... | H04L 12/189 370/280 |

FOREIGN PATENT DOCUMENTS

| | | |
|---|---|---|
| CN | 101667898 A | 3/2010 |
| WO | 2010110561 A2 | 9/2010 |

OTHER PUBLICATIONS

International Search Report and Written Opinion received for corresponding Patent Cooperation Treaty Application No. PCT/CN2012/077739, dated Apr. 18, 2013, 10 pages.

* cited by examiner

*Primary Examiner* — Christopher Crutchfield
*Assistant Examiner* — Abu-Sayeed Haque
(74) *Attorney, Agent, or Firm* — Squire Patton Boggs (US) LLP

(57) ABSTRACT

A method including utilizing HARQ process grouping and subframe grouping to carry ACK/NACK transmissions, wherein the HARQ process grouping divides HARQ processes into one or more groups, and the subframe grouping divides a radio frame into one or more groups. The method may further include carrying ACK/NACK transmissions.

20 Claims, 10 Drawing Sheets

Utilizing HARQ process grouping and subframe grouping to transmit ACK/NACK transmissions — 800

Carrying ACK/NACK transmissions — 810

Downlink association set index $K: \{k_0, k_1, \cdots k_{M-1}\}$ for TDD

| UL-DL Configuration | Subframe $n$ | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

Fig. 2

| Table 1: Illustration of HARQ process groupingPayload per PUCCH resource (group index + A/N bits) | PUCCH channels/ resources needed |
|---|---|
| 15 bits | 1 |
| 1+8 bits | 2 |
| 2+4 bits | 4 |
| 3+2 bits | 8 |
| 4+1 bits | 15 |

Fig. 3

| Header to indicate PUCCH format | | Grouping indicator | A/N payload per PUCCH resource | Total payload per PUCCH resource |
|---|---|---|---|---|
| 1 bit | / | 2 bits | 4 bits | Format A: 7 bits |
| 1 bit | 1 bit | 3 bits | 2 bits | Format B1: 7 bits |
| | 1 bit | 4 bits | 1 bit | Format B2: 7 bits |

Fig. 4

| Header to indicate PUCCH format | | Radio frame indicator | Grouping indicator | A/N payload per PUCCH resource | Total payload per PUCCH resource |
|---|---|---|---|---|---|
| 1 bit | / | 1 bit | 1 bit | 5 bits | Format C: 8 |
| 1 bit | 1 bit | 1 bit | 2 bits | 3 bits | Format D1: 8 |
| | 1 bit | 1 bit | 4 bits | 1 bit | Format D2: 8 |

Fig. 5

| Header to indicate grouping method | Grouping method | Header to indicate PUCCH format | Radio frame indicator | Grouping indicator | A/N payload per PUCCH resource | Total payload per PUCCH resource |
|---|---|---|---|---|---|---|
| 1 bit | HARQ process grouping | 1 bit | / | / | 2 bits | 4 bits | Format A: 8 bits |
| | | 1 bit | 1 bit | / | 3 bits | 2 bits | Format B1: 8 bits |
| | | 1 bit | / | 4 bits | 1 bit | Format B2: 8 bits |
| 1 bit | Subframe grouping | 1 bit | / | 1 bit | 1 bit | 5 bits | Format C: 9 bits |
| | | 1 bit | 1 bit | 1 bit | 3 bits | 2 bits | Format D1: 9 bits |
| | | 1 bit | 1 bit | 4 bits | 1 bit | Format D2: 9 bits |

Fig. 6

| Header to indicate PDCCH format | Grouping indicator | A/N payload per PDCCH channel | Total payload per PDCCH channel |
|---|---|---|---|
| 1 bit | 1 bit | 2 bits | Format A: 4 bits |
| 1 bit | 2 bits | 1 bits | Format B: 4 bits |

Fig. 7

FLEXIBLE HARQ ACK/NACK TRANSMISSION

RELATED APPLICATION

This application was originally filed as Patent Cooperation Treaty Application No. PCT/CN2012/077739 filed Jun. 28, 2012.

BACKGROUND

Field

Embodiments of the invention relate to standards for wireless communication of data, such as, but not limited to, 3rd Generation Partnership Project (3GPP) Long Term Evolution (LTE)/LTE-Advanced and standards for 3GPP LTE systems that are deployed in a local area.

Description of the Related Art

In LTE Release 8, LTE Release 9, and LTE Release 10, a fixed Hybrid Automatic Repeat Request (HARQ) timing was defined and the process for Acknowledged/Not Acknowledged (ACK/NACK) transmission was specified.

As described in LTE Release 8, LTE Release 9, and LTE Release 10, for time division duplex (TDD), the user equipment (UE) transmits the ACK/NACK response in an uplink (UL) subframe n. The UE transmits this response upon detection of a Physical Downlink Shared Channel (PDSCH) transmission or a Physical Downlink Control Channel (PDCCH) transmission that indicates downlink semi-persistent scheduling (SPS) release within subframe(s) n−k intended for the UE and for which an ACK/NACK response shall be provided. Specifically, k∈K, and K is defined in FIG. 2.

SUMMARY

One embodiment is directed to a method including utilizing HARQ process grouping and subframe grouping to carry ACK/NACK transmissions. The HARQ process grouping may include dividing HARQ processes into one or more groups. The subframe grouping may include dividing a radio frame into one or more groups. The method may further include carrying ACK/NACK transmissions.

Another embodiment may include an apparatus which may include at least one processor and at least one memory including computer program code. The at least one memory and the computer program code are configured, with the at least one processor, to cause the apparatus at least to utilize HARQ process grouping and subframe grouping to carry ACK/NACK transmissions, wherein the HARQ process grouping divides HARQ processes into one or more groups, and the subframe grouping divides a radio frame into one or more groups, and to carry ACK/NACK transmissions.

Another embodiment may include a computer program, embodied on a computer readable medium. The computer program may be configured to control a processor to perform a process including utilizing HARQ process grouping and subframe grouping to carry ACK/NACK transmissions, wherein the HARQ process grouping divides HARQ processes into one or more groups, and the subframe grouping divides a radio frame into one or more groups, and carrying ACK/NACK transmissions.

Another embodiment is directed to an apparatus including means for utilizing HARQ process grouping and subframe grouping to carry ACK/NACK transmissions, wherein the HARQ process grouping divides HARQ processes into one or more groups, and the subframe grouping divides a radio frame into one or more groups, and means for carrying ACK/NACK transmissions.

Another embodiment may include a method including receiving ACK/NACK transmissions from user equipment, wherein the HARQ process grouping divides HARQ processes into one or more groups, the subframe grouping divides a radio frame into one or more groups, and one of a HARQ process group ID and a subframe group ID is transmitted when carrying ACK/NACK transmissions, and distinguishing between HARQ process grouping and subframe grouping.

Another embodiment may include an apparatus comprising at least one processor and at least one memory including computer program code. The at least one memory and the computer program code may be configured, with the at least one processor, to cause the apparatus at least to receive ACK/NACK transmissions from user equipment, wherein the HARQ process grouping divides HARQ processes into one or more groups, the subframe grouping divides a radio frame into one or more groups, and one of a HARQ process group ID and a subframe group ID is transmitted when carrying ACK/NACK transmissions, and to distinguish between HARQ process grouping and subframe grouping.

Another embodiment may include a computer program, embodied on a computer readable medium. The computer program may be configured to control a processor to perform a process including receiving ACK/NACK transmissions from user equipment, wherein the HARQ process grouping divides HARQ processes into one or more groups, the subframe grouping divides a radio frame into one or more groups, and one of a HARQ process group ID and a subframe group ID is transmitted when carrying ACK/NACK transmissions, and distinguishing between HARQ process grouping and subframe grouping.

Another embodiment may include an apparatus including means for receiving ACK/NACK transmissions from user equipment, wherein the HARQ process grouping divides HARQ processes into one or more groups, the subframe grouping divides a radio frame into one or more groups, and one of a HARQ process group ID and a subframe group ID is transmitted when carrying ACK/NACK transmissions, and means for distinguishing between HARQ process grouping and subframe grouping.

BRIEF DESCRIPTION OF THE DRAWINGS

For proper understanding of the invention, reference should be made to the accompanying drawings, wherein:

FIG. 2 illustrates a downlink association set index K: $\{k_0, k_1, \ldots, k_{M-1}\}$ for time division duplex;

FIG. 3 illustrates corresponding Physical Uplink Control Channel (PUCCH) resources that may be necessary for each of five options according to one embodiment;

FIG. 4 illustrates a PUCCH format for HARQ process grouping according to one embodiment;

FIG. 5 illustrates a PUCCH format for subframe grouping according to one embodiment;

FIG. 6 illustrates a PUCCH format that utilizes HARQ process grouping and subframe grouping (and also with a 1 bit indicator) according to one embodiment;

FIG. 7 illustrates a PDCCH format for HARQ process grouping according to one embodiment;

DETAILED DESCRIPTION

It will be readily understood that the components of the invention, as generally described and illustrated in the figures herein, may be arranged and designed in a wide variety of different configurations. Thus, the following detailed description of the embodiments of a method, an apparatus, and a computer program product for flexible HARQ ACK/NACK transmission as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings, and embodiments of this invention, and not in limitation thereof.

There exist several scenarios that use local area networks (e.g. indoor hotspots as shown in TR36.814) where the local area is mainly composed of multiple rooms. Other scenarios may use local area networks within a local area that is a large work place (i.e., office enterprise scenarios). However, neither the deployment of pico nor the deployment of home evolved Node Bs (eNBs) in current 3GPP sufficiently meet the needs for office enterprise scenarios.

Figure 1:
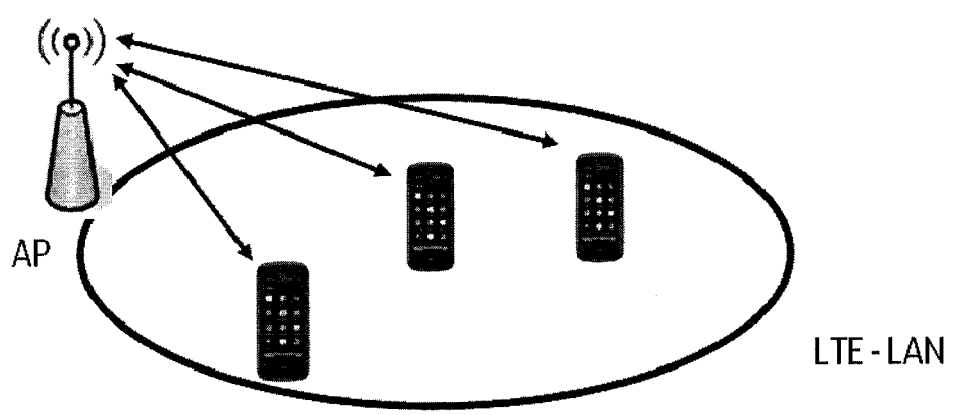
FIG. 1 illustrates a configuration of an LTE-Local Area Network according to one embodiment.

In view of the above, there has been research directed to local area evolution (LAE) and LTE-Local Area Network (LTE-LAN) technologies. Originally, LTE-LAN aimed to provide very high speed data transmission for local area coverage, such as for indoor, residential, and enterprise scenarios. As shown in FIG. 1, an illustration of a configuration of an LTE-LAN, according to one embodiment, is provided. The LTE-LAN access point (AP) may provide LTE-based wireless connections to local area devices. The mobile terminals working in this local area network may establish radio connections with LTE-LAN AP.

In recent years, wireless local area networks (WLANs) have become increasingly popular because they enable access to the Internet and local services with low-cost infrastructure. They also may enable cheap and fast access to spectrums in the license-exempt bands.

Operation on licensed bands also has benefits. Operation on licensed bands can guarantee a planned (interference) environment instead of an uncoordinated environment. Hence, it could be more convenient for local service providers to make investment decisions based on access to the licensed spectrum as compared to the unlicensed spectrum. However, the access to the licensed spectrum should be granted with expenses that are low enough, lower than the license fees of cellular operators.

In the interest of providing licensed spectrum access, a cellular operator may offer cost-efficient access to the licensed spectrum enabled by device-to-device (D2D) communication as a controlled or constrained underlay to an International Mobile Telecommunications-Advanced (IMT-Advanced) cellular network.

D2D communication as an underlay to a cellular network may operate on the same resources as the cellular network. As user equipment (UE) is served by the network via the base stations, called eNBs in the LTE architecture, UE units may communicate directly with each other over the D2D links.

D2D communication may have a variety of associated benefits including: (1) efficient radio resource utilization, (2) potential for reduced power consumption, (3) potential for reduced delays, (4) potential for increased system spectrum efficiency, and (5) potential for offloading network traffic.

In an LTE-based local area network, the adoption of orthogonal frequency division multiple access (OFDMA) in uplink transmission has been promising because uplink peak-to-average-power ratio (UL PAPR) may not be an important issue in local area networks. The UL PAPR may not be an important issue because transmission (Tx) power of UE is almost equal to that of eNB and the UL signal to interference plus noise ratio (SINR) distribution is very close to the DL SINR distribution. Besides, OFDMA for UL in a local area network has several benefits compared to Single-Carrier Frequency Division Multiple Access (SC-FDMA). Such benefits include: more flexible resource allocation, UL/DL similarity for D2D cases, similar UL/DL structure for interference-aware cancellation design (especially for dynamic TDD UL/DL configuration switching), and having the same radio chip applicable for both UE and LAN AP.

Therefore, UL control channels may need to be redesigned for local area networks, and UL scheduling procedures also may need to be redesigned, so that OFDMA can be applicable for UL transmission. UE may need to be configured with a new UL control channel or UL signaling procedure, which is more appropriate for a local area network. Meanwhile, UE behaviors also may need to be clearly standardized.

According to the current LTE specifications, the HARQ timing is pre-defined. During DL transmission, UE knows when it should transmit ACK/NACK to an eNB, and the eNB knows when to receive ACK/NACK from the UE. During UL transmission, the eNB knows when it should transmit ACK/NACK to the UE, and the UE knows when to receive ACK/NACK from the eNB. However, in D2D communication, from the perspective of one UE engaged in the D2D communication, the frame structure may not be fixed because the transmission/reception may be dynamically scheduled by an eNB. Thus, HARQ timing may become complicated and it may be impractical to pre-define the HARQ timing in advance. Another problem relates to knowing how to transmit ACK/NACK corresponding to multiple subframes.

TDD configuration may be dynamically changed to capture the traffic fluctuation of uplink and downlink. As such, similar problems also exist in this flexible TDD configuration technique.

Furthermore, according to the current LTE specifications, the uplink control indicator (UCI) design may be restricted due to a single carrier characteristic (e.g. only one PUCCH is allowed to be transmitted in one subframe for a UE). As previously mentioned, OFDMA may be very promising to be adopted in uplink transmission because UL cubic metric (CM) is not an important issue in local area networks due to low transmission power. The design of UCI may be optimized under OFDMA because OFDMA-based UL is less constrained and thus can provide more flexibility for UL design compared to that of SC-FDMA.

Principles directed to ACK/NACK design corresponding to DL data transmission may be extended to UL data transmission as well as to D2D communication.

Certain embodiments of the invention may resolve HARQ timing problems for D2D communication and for flexible TDD configurations. Certain embodiments may reduce latency. It should be noted that advantages of the present invention are not limited to those discussed above and other advantages may be realized according to embodiments of the invention.

Certain embodiments of the invention may provide UE that can flexibly select an available UL subframe to carry ACK/NACK transmissions. Certain embodiments may provide a PUCCH channel to carry the ACK/NACK information. Using UL OFDMA, UE can transmit multiple PUCCH channels simultaneously in one UL subframe. Certain embodiments provide a PUCCH design scheme for flexible ACK/NACK feedback.

Certain embodiments of the invention utilize two grouping methods. An eNB may configure UE and thus determine which grouping method to use through radio resource control (RRC) signaling, or UE can dynamically select the grouping method for ACK/NACK feedback. Using such a flexible ACK/NACK scheme, a field for downlink assignment index (DAI) may no longer be needed. The field may be reused to indicate the ACK/NACK transmission method for two codewords transmission of one physical downlink shared channel (PDSCH).

Certain embodiments of the invention utilize HARQ process grouping and subframe grouping. In certain embodiments, UE can dynamically select HARQ process grouping or subframe grouping to transmit ACK/NACK. There are two alternatives to distinguish which grouping method is used:
1. UE can autonomously select HARQ process grouping or subframe grouping to transmit ACK/NACK. A 1-bit indicator is added to differentiate between these two grouping methods. An eNB may differentiate the grouping method from the 1-bit indicator.
2. UE can autonomously select HARQ process grouping or subframe grouping to transmit ACK/NACK. An eNB may differentiate between the grouping methods by using blind decoding since the payload size of these two grouping methods may be different.

With regard to HARQ process grouping, in certain embodiments, HARQ processes may be divided into several groups, where each group is composed of several HARQ processes. The groups may be commonly known by both eNB and UE. When UE wants to transmit ACK/NACK, it can transmit a HARQ process group ID as well as ACK/NACK information. eNB can distinguish the ACK/NACK information corresponding to each of the HARQ processes from the group ID.

With regard to subframe grouping, in certain embodiments, one radio frame can be divided into several groups, where each group is composed of several subframes. These groups may be commonly known by both eNB and UE. When UE wants to transmit ACK/NACK, it can transmit a subframe group ID as well as ACK/NACK information. eNB can distinguish the ACK/NACK information corresponding to each of the subframes from the group ID.

With regard to refarming of the DAI field of a PDCCH, 1 bit of the DAI field may be used to indicate how to transmit ACK/NACK (according to an alternative 1 or an alternative 2) in the case of a two codeword transmission of one PDSCH. According to alternative 1, the ACK/NACK information corresponding to which codeword is implicitly linked to which grouping method that is used. According to alternative 2, the ACK/NACK for the two codewords is bundled.

The principles of the above ACK/NACK transmission scheme are very flexible and can be applicable to various scenarios (e.g. Frequency Division Duplex (FDD)/Time Division Duplex (TDD) systems, D2D communication, and flexible TDD configurations).

With regard to the HARQ process grouping for certain embodiments, the maximum number of HARQ processes according to LTE specification is 15.

There may be 5 possible options for dividing these 15 HARQ processes into groups.
Option 1: 15 HARQ processes consist 1 group
Option 2: 15 HARQ processes can be divided into 2 groups with 8 processes in one group and 7 processes in the other group
Option 3: 15 HARQ processes can be divided into 3 groups with 4 processes in 3 groups and 3 processes in 1 group
Option 4: 15 HARQ processes can be divided into 8 groups with 2 processes in 7 groups and 1 process in 1 group
Option 5: 15 HARQ processes can be divided into 15 groups with 1 process in each group FIG. 3 summarizes the corresponding PUCCH channel/resources, according to one embodiment, that may be needed for each of the above options in order to support a maximum of 15 HARQ processes.

Option 5 can achieve the most flexibility but, referring to FIG. 3, it can be seen that option 5 may cause large overhead. For example, if UE wants to transmit ACK/NACK corresponding to 15 HARQ processes, the UE may need 15 PUCCH channels/resources. Taking both flexibility and overhead into account, certain embodiments provide a new PUCCH channel that covers several options from the 5 options (e.g. option 3, option 4, and option 5).

In certain embodiments, the total payload for the PUCCH channel may be 7 bits, with 1 bit acting as an indicator for differentiating a Format A from a Format B1 and a Format B2.

Referring to FIG. 4, Format A may use 2 bits to indicate a HARQ process group and use 4 bits to indicate 4 ACK/NACK transmissions in the group.

Formats B1 and B2 may use a 1 bit indicator to differentiate between each other. Format B1 may use 3 bits to indicate a HARQ process group ID and 2 bits to indicate 2 ACK/NACK transmissions in the group. Format B2 may use 4 bits to indicate a HARQ process group ID and 1 bit to indicate an ACK/NACK transmission.

Meanwhile, an eNB can configure PUCCH resources to UE (e.g. 1, 2, and 3 PUCCH resources). With the configured PUCCH resources, UE can determine the simultaneous number of ACK/NACK that needs to be transmitted in one subframe and the PUCCH format for each PUCCH resource. Format A may be used if there is HARQ process group composed of 4 contiguous HARQ processes. Format B1 may be used if there is a HARQ process group composed of 2 contiguous HARQ processes. With regard to power consumption, for a non-power limited case, UE can select a PUCCH format to make full use of all the configured PUCCH resources. For a power limited case, UE can select a PUCCH format to use less PUCCH resources to save power.

One example of simultaneous ACK/NACK transmission in one UL subframe from a UE point of view is shown below.
If UE needs to transmit 1 ACK/NACK transmission:
If 1, 2, or 3 PUCCH resource(s) is(are) configured, UE may use 1 PUCCH channel of format B2 to carry ACK/NACK
If UE needs to transmit 2 ACK/NACK transmissions:
If 1 PUCCH resource is configured, UE may use 1 PUCCH channel of format B1 to carry ACK/NACK If 2 or 3 PUCCH resources are configured, UE may use 2 PUCCH channels of format B2 to carry ACK/NACK If UE needs to transmit 3 ACK/NACK transmissions:
    If 1 PUCCH resource is configured, UE may use multiple subframes to transmit ACK/NACK
    If 2 PUCCH resources are configured, UE may use 2 PUCCH channels of format B1 to carry ACK/NACK
    If 3 PUCCH resources are configured, UE may use 3 PUCCH channels of format B2 to carry ACK/NACK If UE needs to transmit 4 ACK/NACK transmissions:
    If 1 PUCCH resource is configured, UE may use 1 PUCCH channel of format A to carry ACK/NACK
    If 2 PUCCH resources are configured, UE may use 2 PUCCH channels of format B1 to carry ACK/NACK
    If 3 PUCCH resources are configured, UE may use 1 PUCCH channel of format B1 and 2 PUCCH channels of format B2 to carry ACK/NACK If UE needs to transmit 5 ACK/NACK transmissions:
    If 1 PUCCH resource is configured, UE may use multiple subframes to transmit ACK/NACK
    If 2 PUCCH resources are configured, UE may use 1 PUCCH channel of format A and 1 PUCCH channel of format B2 to carry ACK/NACK
    If 3 PUCCH resources are configured, UE may use 2 PUCCH channels of format B1 and 1 PUCCH channel of format B2 to carry ACK/NACK If UE needs to transmit 6 ACK/NACK transmissions:
    If 1 PUCCH resource is configured, UE may use multiple subframes to transmit ACK/NACK
    If 2 PUCCH resources are configured, UE may use 1 PUCCH channel of format A and 1 PUCCH channel of format B1 to carry ACK/NACK
    If 3 PUCCH resources are configured, UE may use 1 PUCCH channel of format A and 2 PUCCH channels of format B2 to carry ACK/NACK If UE needs to transmit 7 ACK/NACK transmissions:
    If 1 or 2 PUCCH resource(s) is(are) configured, UE may use multiple subframes to transmit ACK/NACK
    If 3 PUCCH resources are configured, UE may use 1 PUCCH channel of format A, 1 PUCCH channel of format B1, and 1 PUCCH channel of format B2 to carry ACK/NACK If UE needs to transmit 8 ACK/NACK transmissions:
    If 1 PUCCH resource is configured, UE may use multiple subframes to transmit ACK/NACK
    If 2 PUCCH resources are configured, UE may use 2 PUCCH channels of format A to carry ACK/NACK
    If 3 PUCCH resources are configured, UE may use 1 PUCCH channel of format A and 2 PUCCH channels of format B1 to carry ACK/NACK If UE needs to transmit 9 ACK/NACK transmissions:
    If 1 or 2 PUCCH resource(s) is(are) configured, UE may use multiple subframes to transmit ACK/NACK
    If 3 PUCCH resources are configured, UE may use 2 PUCCH channels of format A and 1 PUCCH channel of format B2 to carry ACK/NACK With subframe grouping, similar to HARQ process grouping, there can be many options to divide one radio frame into groups. However, taking both flexibility and overhead into account, certain embodiments provide for a PUCCH format that covers three options: (1) one radio frame can be divided into 2 groups with 5 subframes in each group, (2) one radio frame can be divided into 4 groups with 3 subframes in 3 groups and 1 subframe in 1 group, and (3) one radio frame can be divided into 9 groups with 1 subframe in each group.

In certain embodiments, the total payload for the PUCCH channel is 8 bits, with 1 bit acting as an indicator to differentiate a Format C from a Format D1 and a Format D2.

Referring to FIG. 5, Format C may use 1 bit to indicate a subframe group and 5 bits to indicate 5 ACK/NACK transmissions in the group.

Formats D1 and D2 may use a 1 bit indicator to differentiate between each other. Format D1 may use 2 bits to indicate a subframe group and 3 bits to indicate 3 ACK/NACK transmissions in the group. Format D2 may use 4 bits to indicate a subframe ID and 1 bit to indicate an ACK/NACK transmission. Formats C, D1, and D2 may also use a radio frame indicator. The radio frame indicator may be 1 bit that indicates a current radio frame or a last radio frame.

Meanwhile, an eNB can configure PUCCH resources to UE (e.g. 1, 2, and 3 PUCCH resources). With the configured PUCCH resources, UE can determine the simultaneous number of ACK/NACK transmissions that need to be transmitted in one subframe and the PUCCH format for each PUCCH resource. Format C may be used if there is a subframe group composed of 5 contiguous DL subframes. Format D1 may be used if there is a subframe group composed of 3 contiguous subframes. With regard to power consumption, for a non-power limited case, UE can select a PUCCH format to make full use of all the configured PUCCH resources. For a power limited case, UE can select a PUCCH format to use less PUCCH resources to save power.

Certain embodiments provide a combination of HARQ process grouping and subframe grouping. In view of the above, a grouping method of HARQ processes may be beneficial in cases where the HARQ process ID is contiguously allocated while a subframe index for each PDSCH may be scattered. On the other hand, a grouping method of subframes may be beneficial in cases where a subframe index for each PDSCH is contiguous while the HARQ process ID is non-contiguous. The subframe grouping method may also be beneficial for semi-persistent scheduling since there is no scheduling grant which results in no HARQ process ID. Considering the advantages of each method, a combination of the two grouping methods is provided by certain embodiments. An eNB can configure UE and determine which grouping method to use through RRC signaling or UE can dynamically select the grouping method for ACK/NACK feedback.

UE can dynamically select HARQ process grouping or subframe grouping to transmit ACK/NACK. There are two alternatives to distinguish between which grouping method is used. First, UE can autonomously select HARQ process grouping or subframe grouping to transmit ACK/NACK. Referring to FIG. 6, a 1 bit indicator may be used to differentiate between a HARQ process grouping and a subframe grouping. Second, UE can autonomously select HARQ process grouping or subframe grouping to transmit ACK/NACK. An eNB may differentiate the grouping method by blind decoding since the payload size of these two grouping methods are different, as shown in FIG. 6.

For TDD, there may be one field of DAI of PDCCH, which can help UE to know how many PDSCHs are transmitted by eNB. However, for the flexible ACK/NACK scheme provided by certain embodiments, the field of DAI may not be needed any more. The field of DAI can be reused to indicate the ACK/NACK transmission method for two codewords transmission of one PDSCH.

1 bit of DAI can be used to indicate how to transmit ACK/NACK (according to Alternative 1 or Alternative 2 below) in case of two codewords transmission of one PDSCH.

In alternative 1, the ACK/NACK information corresponding to which codeword is implicitly linked to which grouping method that is used. An eNB can configure the following two mapping options to UE through RRC signaling. If one codeword is transmitted, either HARQ process grouping or subframe grouping can be applied to codeword 0. According to an Option 1 of alternative 1, HARQ process grouping is linked to codeword 0, and subframe grouping is linked to codeword 1. According to Option 2 of alternative 1, HARQ process grouping is linked to codeword 1, and subframe grouping is linked to codeword 0.

According to Alternative 2, the ACK/NACK for the two codeword is bundled. If one codeword is transmitted, no bundling is applied.

The detailed procedure for UE dynamically selecting an ACK/NACK grouping method is as follows:
  Step 1: An eNB can configure UE with the implicit mapping rule between grouping method and codeword index. The eNB can configure UE with PUCCH resources for ACK/NACK transmission based on the transmission mode.
  Step 2: The eNB can send PDCCH and corresponding PDSCH in one or multiple subframes. The eNB can indicate to UE which alternative is used for ACK/NACK transmission in case of two codeword transmission via DAI in PDCCH.
  Step 3: UE may select the ACK/NACK grouping method and transmit ACK/NACK in one or multiple subframes in the PUCCH resources configured by the eNB and configured in accordance with power consumption requirements. In the case of two codeword transmission, UE can transmit ACK/NACK corresponding to the two codewords based on the methods indicated by DAI in the PDCCH.
  Step 4: The eNB may receive ACK/NACK formation in the configured PUCCH resources. The eNB can differentiate the grouping method by blind decoding or by a 1 bit indicator.

The principles of ACK/NACK transmission of the above embodiments can be applied to various scenarios (e.g. D2D communication and flexible TDD configurations).

The above principles can be extended to UL HARQ transmission and support asynchronous UL HARQ transmission. PDCCH or new channels can carry ACK/NACK information. For subframe grouping, the extension from DL to UL is straightforward. For HARQ process grouping, the maximum number of HARQ processes defined by current LTE specification is 7. One embodiment is given below.

There are 3 possibilities to divide these 7 HARQ processes into groups:
  Option 1: 7 HARQ processes consist 1 group
  Option 2: 7 HARQ processes can be divided into 2 groups with 4 processes in one group and 3 processes in the other group
  Option 3: 7 HARQ processes can be divided into 4 groups with 2 processes in 3 groups and 1 process in 1 group Taking both flexibility and overhead into account, embodiments of the invention provide a PDCCH channel that covers several options from the 3 options (e.g. option 2 and option 3), as shown in FIG. 7.

Then UL HARQ procedure can be as follows:
  Step 1: An eNB schedules PUSCH initial transmission via an UL grant. The UL grant can contain information relating to PUSCH (e.g. which subframe to transmit PUSCH).
  Step 2: UE may transmit PUSCH in the subframe indicated by the UL grant
  Step 3: The eNB may send ACK/NACK on PDCCH or new channels in the available DL subframe.
  Step 4: UE may detect the corresponding ACK/NACK information.
  Step 5: The eNB schedules PUSCH retransmission via the UL grant. The UL grant can contain information relating to PUSCH (e.g. which subframe to transmit PUSCH)

Figure 8:
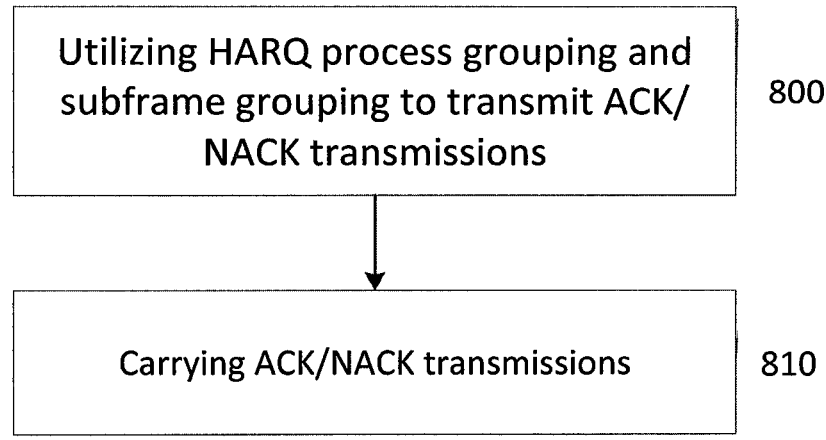
FIG. 8 illustrates a flow diagram of a method according to one embodiment.

FIG. 8 illustrates a flow diagram of a method according to one embodiment. The method illustrated in FIG. 8 includes, at 800, utilizing HARQ process grouping and subframe grouping to carry ACK/NACK transmissions. At 810, the method includes carrying an ACK/NACK transmissions.

Figure 9:
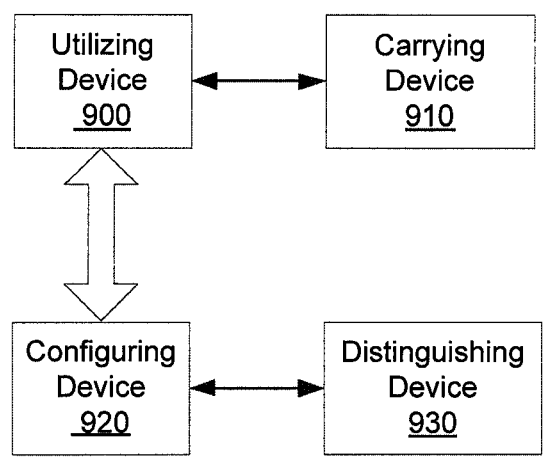
FIG. 9 illustrates a configuration of devices according to one embodiment.

FIG. 9 illustrates a configuration of device according to one embodiment. Utilizing device 900 utilizes HARQ process grouping and subframe grouping to carry ACK/NACK transmissions. Carrying device 910 carries an ACK/NACK transmission. Configuring device 920 configures utilizing device 900. Distinguishing device 930 distinguishes between HARQ process grouping and subframe grouping.

Figure 10:
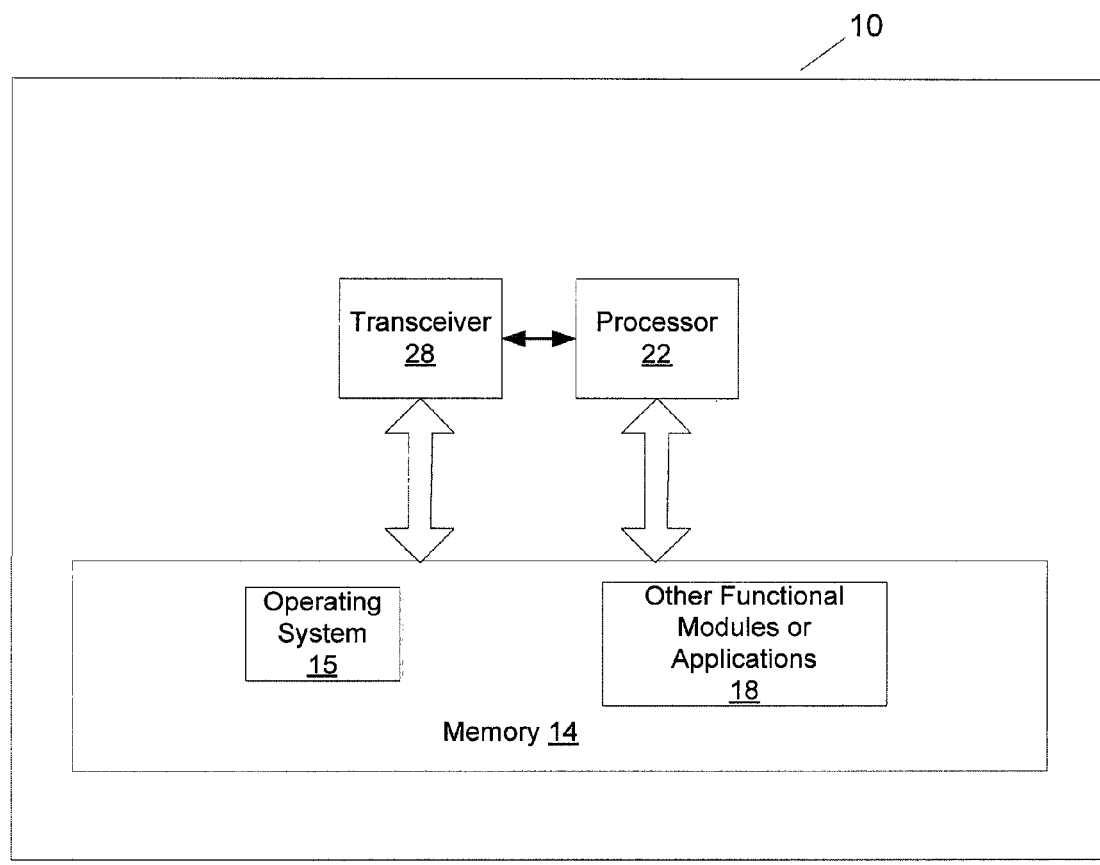
FIG. 10 illustrates an apparatus according to one embodiment.

FIG. 10 illustrates an apparatus 10 according to another embodiment. In an embodiment, apparatus 10 may be user equipment. In other embodiments, apparatus 10 may be an eNB.

Apparatus 10 includes a processor 22 for processing information and executing instructions or operations. Processor 22 may be any type of general or specific purpose processor. While a single processor 22 is shown in FIG. 10, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

As mentioned above, apparatus 10 may be user equipment. In this embodiment, apparatus 10 may be controlled by memory 14 and processor 22 to utilize HARQ process grouping and subframe grouping to carry ACK/NACK transmissions, wherein HARQ process grouping divides HARQ processes into one or more groups, and subframe grouping divides a radio frame into one or more groups. Apparatus 10 may be further controlled by memory 14 and processor 22 to carry ACK/NACK transmissions.

According to another embodiment, apparatus 10 may be an eNB. In this embodiment, apparatus 10 may be controlled by memory 14 and processor 22 to receive ACK/NACK transmissions from user equipment, wherein HARQ process grouping divides HARQ processes into one or more groups, subframe grouping divides a radio frame into one or more groups, and one of a HARQ process group ID and a subframe group ID is transmitted when carrying ACK/NACK transmissions. Apparatus 10 may be further controlled by memory 14 and processor 22 to distinguish between HARQ process grouping and subframe grouping.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method, comprising:
   utilizing HARQ process grouping and subframe grouping to carry ACK/NACK transmissions, wherein the HARQ process grouping divides HARQ processes into one or more groups and the subframe grouping divides a radio frame into one or more groups;
   carrying ACK/NACK transmissions; and
   adding a 1-bit indicator to the HARQ process grouping and the subframe grouping to differentiate between the HARQ process grouping and the subframe grouping.

2. The method according to claim 1, wherein one of a HARQ process group identification and a subframe group identification is transmitted when carrying ACK/NACK.

3. The method according to claim 1, wherein a downlink assignment index indicates how to carry the ACK/NACK in case of two codewords transmission of one physical downlink shared channel.

4. The method according to claim 1, further comprising:
   determining one of HARQ process grouping and subframe grouping to use.

5. The method according to claim 4, wherein the determining comprises determining which grouping method to use through radio resource control signaling configured by a Node B.

6. The method according to claim 4, wherein the determining comprises selecting one of HARQ process grouping and subframe grouping to use.

7. The method according to claim 1, wherein a grouping indicator is transmitted when carrying ACK/NACK transmissions.

8. An apparatus, comprising:
   at least one processor; and
   at least one memory including computer program code,
   the at least one memory and the computer program code configured, with the at least one processor, to cause the apparatus at least to
   utilize HARQ process grouping and subframe grouping to carry ACK/NACK transmissions, wherein the HARQ process grouping divides HARQ processes into one or more groups, and the subframe grouping divides a radio frame into one or more groups;
   carry ACK/NACK transmissions; and
   add a 1-bit indicator to the HARQ process grouping and the subframe grouping to differentiate between the HARQ process grouping and the subframe grouping.

9. The apparatus according to claim 8, wherein one of a HARQ process group identification and a subframe group identification is transmitted when carrying ACK/NACK.

10. The apparatus according to claim 8, wherein a downlink assignment index indicates how to carry the ACK/NACK in case of two codewords transmission of one physical downlink shared channel.

11. The apparatus according to claim 8, the at least one memory and the computer program code configured, with the at least one processor, to further cause the apparatus to:
    determine one of HARQ process grouping and subframe grouping to use.

12. The apparatus according to claim 11, wherein the apparatus is caused to determine which grouping method to use through radio resource control signaling configured by a Node B.

13. The apparatus according to claim 11, wherein the apparatus is caused to select one of HARQ process grouping and subframe grouping to use.

14. The apparatus according to claim 8, wherein a grouping indicator is transmitted when carrying ACK/NACK transmissions.

15. An apparatus, comprising:
    at least one processor; and
    at least one memory including computer program code,
    the at least one memory and the computer program code configured, with the at least one processor, to cause the apparatus at least to receive ACK/NACK transmissions from user equipment, wherein the HARQ process grouping divides HARQ processes into one or more groups, the subframe grouping divides a radio frame into one or more groups, and one of a HARQ process group identification and a subframe group identification is transmitted when carrying ACK/NACK transmissions; and distinguish between HARQ process grouping and subframe grouping at least in part based on a 1-bit indicator of the HARQ process grouping and the subframe grouping.

16. The apparatus according to claim 15, the at least one memory and the computer program code configured, with the at least one processor, to further cause the apparatus to configure the user equipment to utilize HARQ process grouping or subframe grouping, through radio resource control signaling.

17. The apparatus according to claim 15, wherein the ACK/NACK transmissions can apply to device to device communication.

18. The apparatus according to claim 15, the at least one memory and the computer program code configured, with the at least one processor, to further cause the apparatus to receive a grouping indicator from the user equipment.

19. The apparatus according to claim 15, wherein the apparatus is caused to use blind decoding to distinguish between HARQ process grouping and subframe grouping.

20. The apparatus according to claim 15, wherein the apparatus is caused to distinguish between HARQ process grouping and subframe grouping also at least in part based on one of the HARQ process group identification and the subframe group identification received from the user equipment.

* * * * *